(12) United States Patent
Kariya

(10) Patent No.: US 10,846,862 B2
(45) Date of Patent: Nov. 24, 2020

(54) IMAGE PROCESSING METHOD AND IMAGE PROCESSING DEVICE

(71) Applicant: OLYMPUS CORPORATION, Hachioji (JP)

(72) Inventor: Mitsutomo Kariya, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 37 days.

(21) Appl. No.: 16/385,366

(22) Filed: Apr. 16, 2019

(65) Prior Publication Data
US 2019/0244359 A1 Aug. 8, 2019

Related U.S. Application Data

(63) Continuation of application No. PCT/JP2016/080820, filed on Oct. 18, 2016.

(51) Int. Cl.
| | | |
|---|---|---|
| *G06T 7/11* | (2017.01) | |
| *G06T 7/136* | (2017.01) | |
| *G06T 7/60* | (2017.01) | |
| *G06T 1/20* | (2006.01) | |
| *G06T 1/60* | (2006.01) | |

(52) U.S. Cl.
CPC ............. *G06T 7/11* (2017.01); *G06T 1/20* (2013.01); *G06T 1/60* (2013.01); *G06T 7/136* (2017.01); *G06T 7/60* (2013.01)

(58) Field of Classification Search
CPC combination set(s) only.
See application file for complete search history.

(56) References Cited

U.S. PATENT DOCUMENTS 8,129,990 B2 * 3/2012 Yamamoto ........... G06K 9/0014
 324/300
8,781,233 B2 * 7/2014 Kanda ...................... G06T 7/11
 382/195

FOREIGN PATENT DOCUMENTS

JP 2000-339456 A 12/2000
JP 2014-203134 A 10/2014

OTHER PUBLICATIONS

International Search Report dated Nov. 22, 2016, issued in counterpart application No. PCT/JP2016/080820, w/English translation (2 pages).

* cited by examiner

*Primary Examiner* — Tsung Yin Tsai
(74) *Attorney, Agent, or Firm* — Westerman, Hattori, Daniels & Adrian, LLP

(57) ABSTRACT

An image processing method includes: assigning a predetermined new label to the pixels determined to be assigned the label; and setting a position of the pixel assigned the label as a target position and assigning the label with the same value to peripheral pixels located around the pixel at the target position. A label update step repeats a peripheral pixel determination step, a label assignment step of assigning the label to the peripheral pixels, a target position movement step of moving a new target position that is a position of any one of the peripheral pixels assigned the label, and a return position storage step of, when there are a plurality of peripheral pixels assigned the label, storing positions of the peripheral pixels, other than the peripheral pixel at the new target position moved in the target position movement step, until there is no return position.

8 Claims, 9 Drawing Sheets

|   | 1 | 2 | 3 | 4 | 5 | 6 | 7 | 8 |
|---|---|---|---|---|---|---|---|---|
| 1 |   |   |   |   |   |   |   |   |
| 2 |   |   |   |   |   |   |   |   |
| 3 |   |   | 1 | ① | 1 | 1 | 1 |   |
| 4 |   |   | 1 | ① | 1 | ① | 1 |   |
| 5 |   |   | 1 | ① | ① | ① | 1 |   |
| 6 |   |   | 1 | 1 | 1 | 1 | 1 |   |
| 7 |   |   |   |   |   |   |   |   |

FIG. 4K

|   | 1 | 2 | 3 | 4 | 5 | 6 | 7 | 8 |
|---|---|---|---|---|---|---|---|---|
| 1 |   |   |   |   |   |   |   |   |
| 2 |   |   |   |   |   |   |   |   |
| 3 |   |   | 1 | ① | 1 | 1 | 1 |   |
| 4 |   |   | 1 | ① | 1 | ① | 1 |   |
| 5 |   |   | 1 | ① | ① | ① | 1 |   |
| 6 |   |   | 1 | 1 | 1 | 1 | 1 |   |
| 7 |   |   |   |   |   |   |   |   |

FIG. 4L

|   | 1 | 2 | 3 | 4 | 5 | 6 | 7 | 8 |
|---|---|---|---|---|---|---|---|---|
| 1 |   |   |   |   |   |   |   |   |
| 2 |   |   |   |   |   |   |   |   |
| 3 |   |   | 1 | ① | 1 | 1 | 1 |   |
| 4 |   |   | 1 | ① | 1 | ① | 1 |   |
| 5 |   |   | 1 | ① | ① | ① | 1 |   |
| 6 |   |   | 1 | 1 | 1 | 1 | 1 |   |
| 7 |   |   |   |   |   |   |   |   |

|   | 1 | 2 | 3 | 4 | 5 | 6 | 7 | 8 |
|---|---|---|---|---|---|---|---|---|
| 1 |   |   |   |   |   |   |   |   |
| 2 |   |   |   |   |   |   |   |   |
| 3 |   |   |   |   |   |   |   |   |
| 4 |   |   |   |   |   |   |   |   |
| 5 |   |   |   |   |   |   |   |   |
| 6 |   |   |   |   |   |   |   |   |
| 7 |   |   |   |   |   |   |   |   |

(b)

|   | 1 | 2 | 3 | 4 | 5 | 6 | 7 | 8 |
|---|---|---|---|---|---|---|---|---|
| 1 |   |   |   |   |   |   |   |   |
| 2 |   | 1 | 1 | 1 |   |   |   |   |
| 3 |   | 1 | 1 | 1 |   |   |   |   |
| 4 |   | 1 | 1 | 1 |   | 2 | 2 |   |
| 5 |   |   |   |   |   | 2 | 2 |   |
| 6 |   |   |   |   |   |   |   |   |
| 7 |   |   |   |   |   |   |   |   |

IMAGE PROCESSING METHOD AND IMAGE PROCESSING DEVICE

CROSS REFERENCE TO RELATED APPLICATIONS

This application is a continuation application based on a PCT Patent Application No. PCT/JP2016/080820, filed on Oct. 18, 2016, the content of which is incorporated herein by reference.

BACKGROUND

Technical Field

The present invention relates to an image processing method and an image processing device.

Background Art

In the related art, in the image processing field, for example, when a function of tracking a moving subject is performed, there is a process of detecting the position and size of the subject to be tracked which is captured in an image. In this process, a labeling process is performed to determine values of respective pixels included in the image by using a threshold value and the like, to binarize the image into white pixels and black pixels, and to assign a label to an area of the subject to be tracked which is included in the binarized image.

As a method of the labeling process, various methods have been proposed in the related art. As one method of the labeling process, for example, there is a method using a lookup table (LUT). The labeling process using the lookup table is employed in many image processing devices that perform image processing by software and hardware because it is easy to implement. However, the labeling process using the lookup table has a problem that its processing speed is slow.

Furthermore, as another method of the labeling process, for example, as disclosed in Japanese Unexamined Patent Application, First Publication No. 2000-339456, there is a method using a so-called area expansion method in which respective pixels included in an image are scanned (raster scan), and when detecting a target pixel to be assigned a label, a label with the same value is assigned to adjacent peripheral pixels starting from the position of the target pixel, thereby expanding an area of the target pixel to be assigned the label.

In the labeling process using the area expansion method, it is possible to simultaneously acquire the size of each area where a label has been assigned at a high speed and a label with the same value has been assigned.

In the labeling process using the area expansion method, when detecting the target pixel to be assigned the label, a large storage capacity is required to temporarily store the positions of pixels around the target pixel. This is because a procedure for the labeling process using the area expansion method is performed in the following procedure.

(Procedure 1) A raster scan is performed. Then, when detecting the target pixel to be assigned the label, the label is firstly assigned to the detected pixel.

(Procedure 2) At the position of the pixel assigned the label, it is determined whether pixels located around the pixel (for example, four pixels located at the upper, lower, left, and right positions of the pixel assigned the label or eight pixels located at the upper, lower, left, and right positions including an oblique direction) are the target pixels to be assigned the label, and the positions of pixels determined to be the target pixels to be assigned the label are stored.

(Procedure 3) The current position is moved to the position of any one of the pixels determined to be the target pixels to be assigned the label, and a label with the same value as that assigned in the procedure 1 is assigned to this pixel. Then, information on the stored current position is erased.

(Procedure 4) At the moved current position of the pixel, it is determined whether pixels located around the pixel (for example, four pixels located at the upper, lower, left, and right positions of the current pixel or eight pixels located at the upper, lower, left, and right positions including an oblique direction) are the target pixels to be assigned the label, and the positions of pixels determined to be the target pixels to be assigned the label are further stored. In such a case, the positions of pixels as the target pixels to be assigned the label, which have been already stored, that is, the positions of pixels overlappingly determined to be the target pixels to be assigned the label is assigned are not stored.

Then, the processes of the procedure 3 and the procedure 4 are repeated.

(Procedure 5) When the positions of all pixels located around the moved current position of the pixel are stored, the current position is moved to the position of any one pixel stored in the procedure 2 or the procedure 4, that is, the current pixel position is returned to the previously stored pixel position and the procedure 3 and the procedure 4 are repeated again.

(Procedure 6) When there are no positions of any pixel to be stored as an object to be assigned the label with the same value, the current labeling process is completed and target pixels to be assigned a label are detected by a raster scan. That is, areas of other target pixels to be assigned the label are detected. Then, when the other target pixels to be assigned the label are detected by the raster scan, the processes of the aforementioned procedure 1 to procedure 6 are repeated. The label to be assigned to the areas of the detected pixels is a label different from that assigned so far.

As described above, in the labeling process using the area expansion method, until the raster scan of all pixels included in the image is completed, that is, until each label is completely assigned to the areas of the target pixels to be assigned the label, which is included in the image, the processes of the aforementioned procedure 1 to procedure 6 are repeated. By so doing, in the labeling process using the area expansion method, a label with the same value is assigned to each area of the target pixel to be assigned the label, which has been detected by the raster scan.

Therefore, in the labeling process using the area expansion method, it is necessary to provide a storage capacity for returning the current pixel position in the procedure 5 corresponding to an area of each pixel to the previously stored pixel position, that is, a storage capacity capable of storing all the positions of pixels determined to be the target pixels to be assigned the label in the procedure 2 and the procedure 4. The storage capacity requires more storage capacity as the areas of the target pixels to be subjected to the labeling process become larger. For example, when the areas of all the pixels included in the image are the areas of the target pixels to be assigned a label with the same value, it is necessary to provide a storage capacity, which can store pixel positions equivalent to the number of all the pixels included in the image, that is, the number of pixels in the image, as a storage capacity for storing the positions of the target pixels to be assigned the label. This storage capacity requires more storage capacity as the pixel number of the image increases.

SUMMARY

An image processing method, in which pixels included in an input image are scanned in a predetermined scanning order and a label with a predetermined value is assigned to each pixel area where the pixels with a same pixel value included in the image are arranged adjacent to one another and are gathered, includes: a pixel determination step of sequentially determining whether the pixels are pixels to be assigned the label based on pixel values of the pixels obtained by the scanning and assigning a predetermined new label to the pixels determined to be assigned the label; and a label update step of setting a position of the pixel assigned the label as a target position and assigning the label with the same value to peripheral pixels located around the pixel at the target position. The label update step repeats a peripheral pixel determination step of determining whether the peripheral pixels are peripheral pixels to be assigned the label based on pixel values of the peripheral pixels, a label assignment step of assigning the label to the peripheral pixels determined to be assigned the label in the peripheral pixel determination step, a target position movement step of moving a new target position that is a position of any one of the peripheral pixels assigned the label in the label assignment step, and a return position storage step of, when there are a plurality of peripheral pixels assigned the label in the label assignment step, storing positions of the peripheral pixels, other than the peripheral pixel at the new target position moved in the target position movement step, as a return position, until there is no return position stored in the return position storage step. In the return position storage step, when there are a plurality of directions in which areas of the pixels assigned the label with the same value are expanded, only information on positions of pixels arranged adjacent to one another in a direction different from the direction in which the areas are expanded is temporarily stored in a return position memory.

In the image processing method, the label update step may be started after assigning the new label to any pixel in the pixel determination step, and in the label update step, the label with the same value as the value of the new label assigned to the pixel in the pixel determination step may be assigned to each peripheral pixel in the label assignment step, and after the label update step is completed, the scanning may be resumed.

In the pixel determination step, all the pixels included in the image may be scanned in a raster order.

In the target position movement step, the new target position may be moved to a position of any one peripheral pixel located at a lower side or a right side of the target position.

The image may be a binary image.

An image processing device, which scans pixels included in an input image in a predetermined scanning order and assigns a label with a predetermined value to each pixel area where the pixels with the same pixel value included in the image are arranged adjacent to one another and are gathered, includes: a processor configured to perform an image processing method including a pixel determination step of sequentially determining whether the pixels are pixels to be assigned the label based on pixel values of the pixels obtained by the scanning and assigning a predetermined new label to the pixels determined to be assigned the label; and a label update step of setting a position of the pixel assigned the label as a target position and assigning the label with the same value to peripheral pixels located around the pixel at the target position. The label update step repeats a peripheral pixel determination step of determining whether the peripheral pixels are peripheral pixels to be assigned the label based on pixel values of the peripheral pixels, a label assignment step of assigning the label to the peripheral pixels determined to be assigned the label in the peripheral pixel determination step, a target position movement step of moving a new target position that is a position of any one of the peripheral pixels assigned the label in the label assignment step, and a return position storage step of, when there are a plurality of peripheral pixels assigned the label in the label assignment step, storing positions of the peripheral pixels, other than the peripheral pixel at the new target position moved in the target position movement step, as a return position, until there is no return position stored in the return position storage step. In the return position storage step, when there are a plurality of directions in which areas of the pixels assigned the label with the same value are expanded, the processor temporarily stores, in a return position memory, only information on positions of pixels arranged adjacent to one another in a direction different from the direction in which the areas are expanded.

The processor may start the label update step of the image processing method after assigning the new label to any pixel in the pixel determination step, and in the label update step, the label with the same value as the value of the new label assigned to the pixel in the pixel determination step may be assigned to each peripheral pixel in the label assignment step, and the scanning may be resumed after the label update step is completed.

The image processing device may include a return position storage unit that stores the return position in the return position storage step.

BRIEF DESCRIPTION OF THE DRAWINGS

FIG. 4G is a diagram schematically illustrating an example of an image to be subjected to a labeling process in an image processing method in an embodiment of the present invention.

FIG. 4H is a diagram schematically illustrating an example of an image to be subjected to a labeling process in an image processing method in an embodiment of the present invention.

FIG. 4I is a diagram schematically illustrating an example of an image to be subjected to a labeling process in an image processing method in an embodiment of the present invention.

FIG. 4J is a diagram schematically illustrating an example of an image to be subjected to a labeling process in an image processing method in an embodiment of the present invention.

FIG. 4K is a diagram schematically illustrating an example of an image to be subjected to a labeling process in an image processing method in an embodiment of the present invention.

FIG. 4L is a diagram schematically illustrating an example of an image to be subjected to a labeling process in an image processing method in an embodiment of the present invention.

FIG. 4M is a diagram schematically illustrating an example of an image to be subjected to a labeling process in an image processing method in an embodiment of the present invention.

FIG. 4N is a diagram schematically illustrating an example of an image to be subjected to a labeling process in an image processing method in an embodiment of the present invention.

FIG. 4O is a diagram schematically illustrating an example of an image to be subjected to a labeling process in an image processing method in an embodiment of the present invention.

FIG. 5 is a diagram schematically illustrating an example of an image subjected to a labeling process in an image processing method in an embodiment of the present invention.

DETAILED DESCRIPTION OF THE PREFERRED EMBODIMENTS

Hereinafter, embodiments of the present invention will be described with reference to the drawings. The following description will be provided for a case where an image processing method of the present invention, for example, is performed in an image processing device installed in an imaging apparatus such as a still image camera for capturing a still image of a subject and a moving image camera for capturing a moving image.

Figure 1:
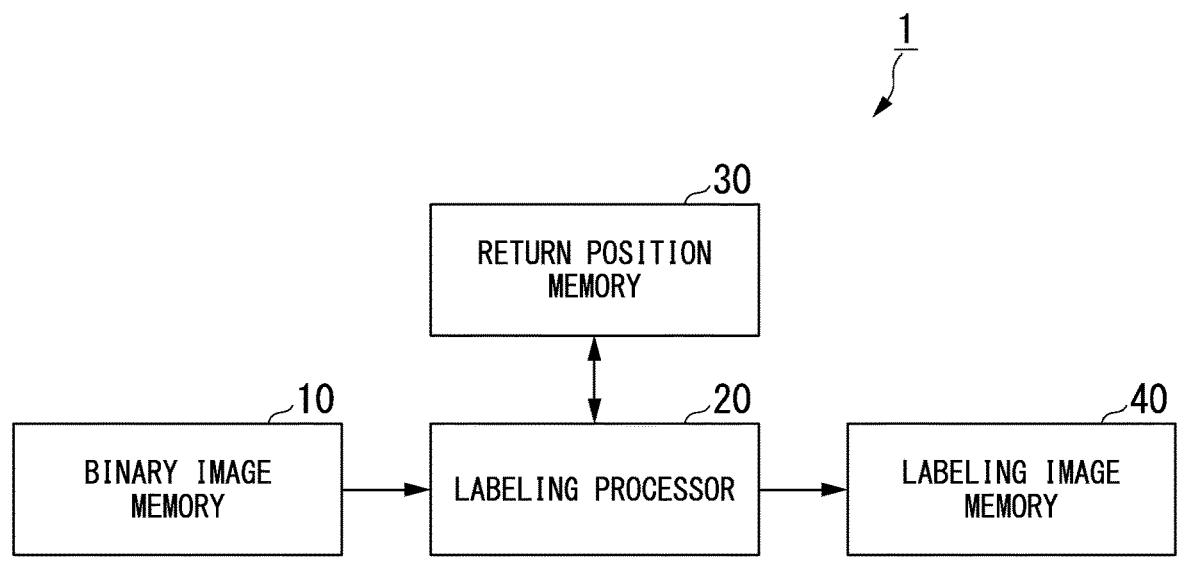
FIG. 1 is a block diagram illustrating an example of a schematic configuration of an image processing device that performs an image processing method in an embodiment of the present invention.

FIG. 1 is a block diagram illustrating an example of a schematic configuration of the image processing device that performs the image processing method in an embodiment of the present invention.

An image processing device 1 illustrated in FIG. 1 includes a binary image memory 10, a labeling processing unit 20, a return position memory 30, and a labeling image memory 40. The image processing of the present invention, that is, a labeling process using an area expansion method is performed by the configuration of the image processing device 1 as illustrated in FIG. 1.

The imaging apparatus performs various functions in addition to a labeling process using an area expansion method (hereinafter, simply referred to as a "labeling process"), which is the image processing of the present invention. Therefore, the imaging apparatus includes a plurality of elements for performing the respective functions. For example, the imaging apparatus includes an image memory such as a dynamic random access memory (DRAM) for temporarily storing image data of a subject captured by an image sensor, an image generation device for generating a still image or a moving image based on the image data stored in the DRAM, a recording processing device for storing the generated still image or moving image, a display processing device for allowing a display device to display the generated still image or moving image, and the like.

Therefore, the elements of the image processing device 1 illustrated in FIG. 1 may be configured such that the elements provided in the imaging apparatus are commonly used as elements for performing other functions. Furthermore, the labeling process performed by the image processing device 1 illustrated in FIG. 1 may be performed as a function of a labeling process in the element (for example, the image generation device for generating the still image or the moving image) provided in the imaging apparatus.

In the image processing device 1, a labeling image generated by performing the labeling process in the labeling processing unit 20 is stored in the labeling image memory 40 with respect to a binary image stored in the binary image memory 10.

The binary image memory 10 is an image storage device that stores image data of a binary image to be subjected to the labeling process. The image data of the binary image stored in the binary image memory 10 (hereinafter, referred to as "binary image data"), for example, is image data of an image (a binary image) obtained by determining values (pixel values) of respective pixels included in an image captured by an image sensor by using a predetermined threshold value and the like and binarizing the image into pixels with a white color (hereinafter, referred to as "white pixels") and pixels with a black color (hereinafter, referred to as "black pixels"). That is, the pixel values of the respective pixels included in the binary image are pixel values representing any one of the white pixels and the black pixels. The binary image data, for example, is generated by the image generation device based on image data of a captured subject.

In the present invention, the configuration of the binary image memory 10 is not particularly limited. For example, the binary image memory 10 may be a dedicated image storage device provided for storing binary image data in the image processing device 1. Furthermore, for example, the binary image memory 10 may be configured to use a part of a storage area of the DRAM provided in the imaging apparatus as an area for storing the binary image data.

The labeling processing unit 20 sequentially reads the binary image data stored in the binary image memory 10 and performs the labeling process on the read binary image data. More specifically, the labeling processing unit 20 performs an operation of the labeling process, which assigns a label with the same predetermined value, on an area where pixels (for example, white pixels) of the same color, to which a label is assigned, are arranged adjacent to one another among respective pixels included in the binary image data, thereby generating an image (a labeling image) in which labels with different values have been assigned to each area where pixels of the same color have been gathered in the binary image. In such a case, the labeling processing unit 20 performs the labeling process while appropriately using the return position memory 30. Then, the labeling processing unit 20 outputs image data of the labeling image generated from the binary image through the labeling process (hereinafter, referred to as "labeling image data") to the labeling image memory 40. Here, the pixel values of respective pixels included in the labeling image generated by the labeling processing unit 20 are values of the labels assigned by the labeling processing unit 20 or pixel values of pixels (any one of pixels among the white pixels and the black pixels) assigned the labels.

The return position memory 30 is a storage device used when the labeling processing unit 20 performs the labeling process. In the present invention, the configuration of the return position memory 30 is not particularly limited. For example, the return position memory 30 may be configured with a memory such as a dedicated static random access memory (SRAM) provided for temporarily storing data, which is output when the labeling processing unit 20 performs the labeling process. Furthermore, for example, the return position memory 30 may be configured to hold data of a register and the like provided in the labeling processing unit 20.

The labeling image memory 40 is an image storage device that stores the labeling image data generated through the labeling process of the labeling processing unit 20. In the present invention, the configuration of the labeling image memory 40 is not particularly limited. For example, the labeling image memory 40 may be a dedicated image storage device provided for storing the labeling image in the image processing device 1. Furthermore, for example, the labeling image memory 40 may be configured to use a part of the storage area of the DRAM provided in the imaging apparatus as an area for storing the labeling image.

With such a configuration, the image processing device 1 performs the labeling process of generating the labeling image in which labels with different values have been assigned to each area where pixels (for example, white pixels) of the same color have been gathered in the binary image.

Next, the processing procedure of the labeling process of the labeling processing unit 20 provided in the image processing device 1 will be described. In the labeling process, the labeling processing unit 20 sequentially acquires (reads pixel values) respective pixels, which are included in the binary image data stored in the binary image memory 10, in a raster order from pixels arranged at the upper left, that is, performs a raster scan, thereby determining whether the acquired pixels are target pixels to be assigned a label. Then, the labeling processing unit 20 assigns the label to the pixels determined to be the target pixels to be assigned the label, sets the position of the current pixel as a reference position, and then further determines whether pixels located around the current pixel (hereinafter, referred to as "peripheral pixels") are the target pixels to be assigned the label. In this way, the labeling processing unit 20 assigns the label with the same value to the pixels determined to be the target pixels to be assigned the label.

Figure 2:
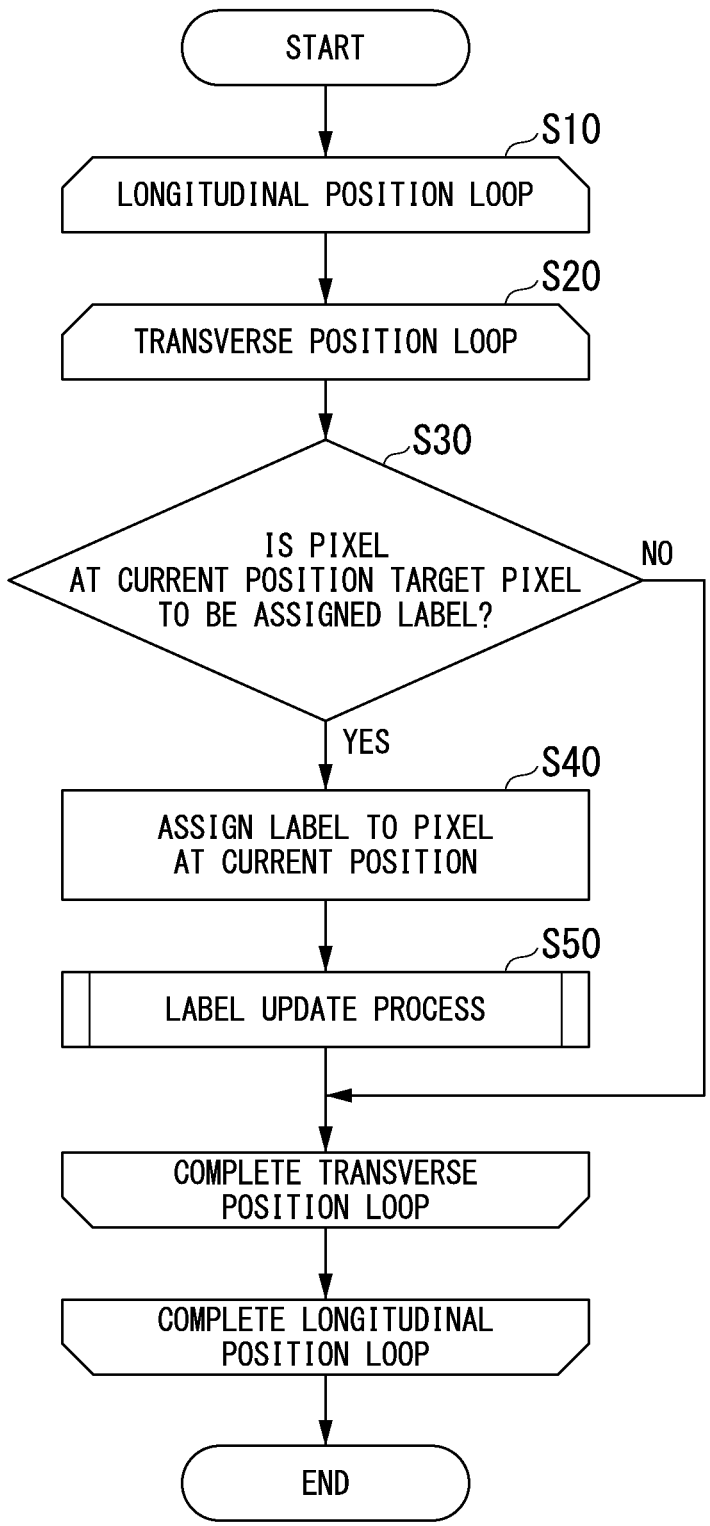
FIG. 2 is a flowchart illustrating a processing procedure of a labeling process in an image processing method of an embodiment of the present invention.

FIG. 2 is a flowchart illustrating a processing procedure of the labeling process in the image processing method of the embodiment of the present invention. The following description will be provided for a case where a label is assigned to the white pixels included in the binary image data.

When the labeling process is started, the labeling processing unit 20 firstly initializes a value of a label to be assigned to pixels.

In the longitudinal position loop of step S10, the labeling processing unit 20 sets a position (hereinafter, referred to as a "longitudinal position") in a longitudinal direction (a vertical direction, a column direction) of pixels for determining whether a pixel at a current position is a target pixel to be assigned a label. Here, the labeling processing unit 20 initially sets a row of pixels at an upper end of the binary image data stored in the binary image memory 10 as the longitudinal position.

Subsequently, in the transverse position loop of step S20, the labeling processing unit 20 sets a position (hereinafter, referred to as a "transverse position") in a transverse direction (a horizontal direction, a row direction) of pixels for determining whether a pixel at a current position is a target pixel to be assigned a label. Here, the labeling processing unit 20 initially sets a column of pixels at a left end of the binary image data stored in the binary image memory 10 as the transverse position.

In this way, in the labeling process, the position of a pixel arranged at the upper left of the binary image data stored in the binary image memory 10 is a position for determining whether a pixel is a target pixel to be initially assigned a label. That is, the labeling processing unit 20 sets the position of the pixel arranged at the upper left of the binary image data as an initial position of the pixel for determining whether the pixel is the target pixel to be assigned the label.

Subsequently, the labeling processing unit 20 acquires (reads) a pixel value of a pixel at a current position included in the binary image data from the binary image memory 10, and determines whether the pixel at the current position is the target pixel to be assigned the label, based on the acquired pixel value of the pixel (step S30). In step S30, when the acquired pixel value of the pixel at the current position is a pixel value representing a white pixel, the labeling processing unit 20 determines that the pixel at the current position is the target pixel to be assigned the label, and when the acquired pixel value of the pixel at the current position is a pixel value representing a black pixel, the labeling processing unit 20 determines that the pixel at the current position is not the target pixel to be assigned the label.

In step S30, when it is determined that that the pixel at the current position is the target pixel to be assigned the label, that is, the pixel value of the pixel at the current position is the pixel value representing the white pixel (YES of step S30), the labeling processing unit 20 assigns the label with the current value to the pixel at the current position in step S40. In step S50, the labeling processing unit 20 performs a label update process of assigning the label with the same value to peripheral pixels located around the pixel at the current position.

On the other hand, in step S30, when it is determined that that the pixel at the current position is not the target pixel to be assigned the label, that is, the pixel value of the pixel at the current position is the pixel value representing the black pixel (NO of step S30), or when the label update process of step S50 based on the pixel at the current position is completed, the labeling processing unit 20 completes the determination regarding whether the current pixel at the set transverse position is the target pixel to be assigned the label. Then, in the transverse position loop of the next step S20, the labeling processing unit 20 moves the transverse position in the transverse direction (the horizontal direction, the row direction) of the pixels for determining the presence of the target pixel to be assigned the label by one pixel rightward, that is, sets the column of second pixels from the left end of the binary image data stored in the binary image memory 10 as a transverse position, and repeats the processes of step S30 to step S50 based on the pixel at the new current position set as the transverse position at the current longitudinal position.

Thereafter, when the labeling processing unit 20 sequentially moves the transverse position by one pixel to the position of right end pixels included in the binary image data and completes the determination for the presence of the target pixel to be assigned the label, that is, completes the determination regarding whether the target pixel to be assigned the label is present in pixels of one row, the transverse position loop of step S20 is completed. Then, in the longitudinal position loop of the next step S10, the labeling processing unit 20 moves the longitudinal position in the longitudinal direction (the vertical direction, the column direction) of the pixels for determining the presence of the target pixel to be assigned the label by one pixel downward, and repeats the process of the transverse position loop in step S20. That is, the labeling processing unit 20 sets the row of pixels in the second row from the upper end of the binary image data stored in the binary image memory 10 as a longitudinal position, and repeats the process of the transverse position loop (that is, step S30 to step S50) in step S20 based on the pixel at the new current position at which pixels at the longitudinal position are sequentially set at the current longitudinal position.

As described above, by the longitudinal position loop of step S10 and the transverse position loop of step S20, the labeling processing unit 20 moves the current position of pixels in a raster order from pixels arranged at the upper left of the binary image data stored in the binary image memory 10 and performs determination regarding whether the target pixel to be assigned the label is present among all the pixels included in one frame of the binary image data, that is, the binary image and a process of assigning a label. In this way, the labeling processing unit 20 generates labeling image data in which labels with different values have been assigned to each area where the white pixels are gathered in the binary image data. Then, the labeling image data generated by the labeling processing unit 20 is stored in the labeling image memory 40.

Next, the label update process performed by the labeling processing unit 20 in step S50 will be described. The following description will be provided for the label update process of assigning a label with the same value to a peripheral pixel located around the white pixel at the current position determined to be the target pixel to be assigned the label in step S30.

In the label update process, the labeling processing unit 20 acquires (reads) the pixel values of each peripheral pixel located around the white pixel at the current position as a reference included in the binary image data stored in the binary image memory 10, and determines the presence of the target pixel to be assigned the label with the same value. Then, the labeling processing unit 20 assigns the label with the same value to the peripheral pixel determined to be the target pixel to be assigned the label. In such a case, when there are a plurality of peripheral pixels to be assigned the label with the same value, the labeling processing unit 20 assigns the label with the same value to all the peripheral pixels, moves the current position to the position of any one of the peripheral pixels, and assigns the label with the same value to pixels (also peripheral pixels) located around the peripheral pixel in the same manner. In addition, the labeling processing unit 20 temporarily stores a position of a peripheral pixel, which has been assigned the label with the same value but has not moved, completes determination regarding whether the target pixel to be assigned the label is present among all pixels arranged adjacent to pixels having moved, returns to the temporarily stored pixel position, and then performs again the determination regarding whether the target pixel to be assigned the label is present among pixels arranged adjacent to the pixel. In this way, the labeling processing unit 20 expands areas of pixels that are to be assigned the label with the same value and are arranged adjacent to respective peripheral pixels located around the white pixel at the current position.

Figure 3:
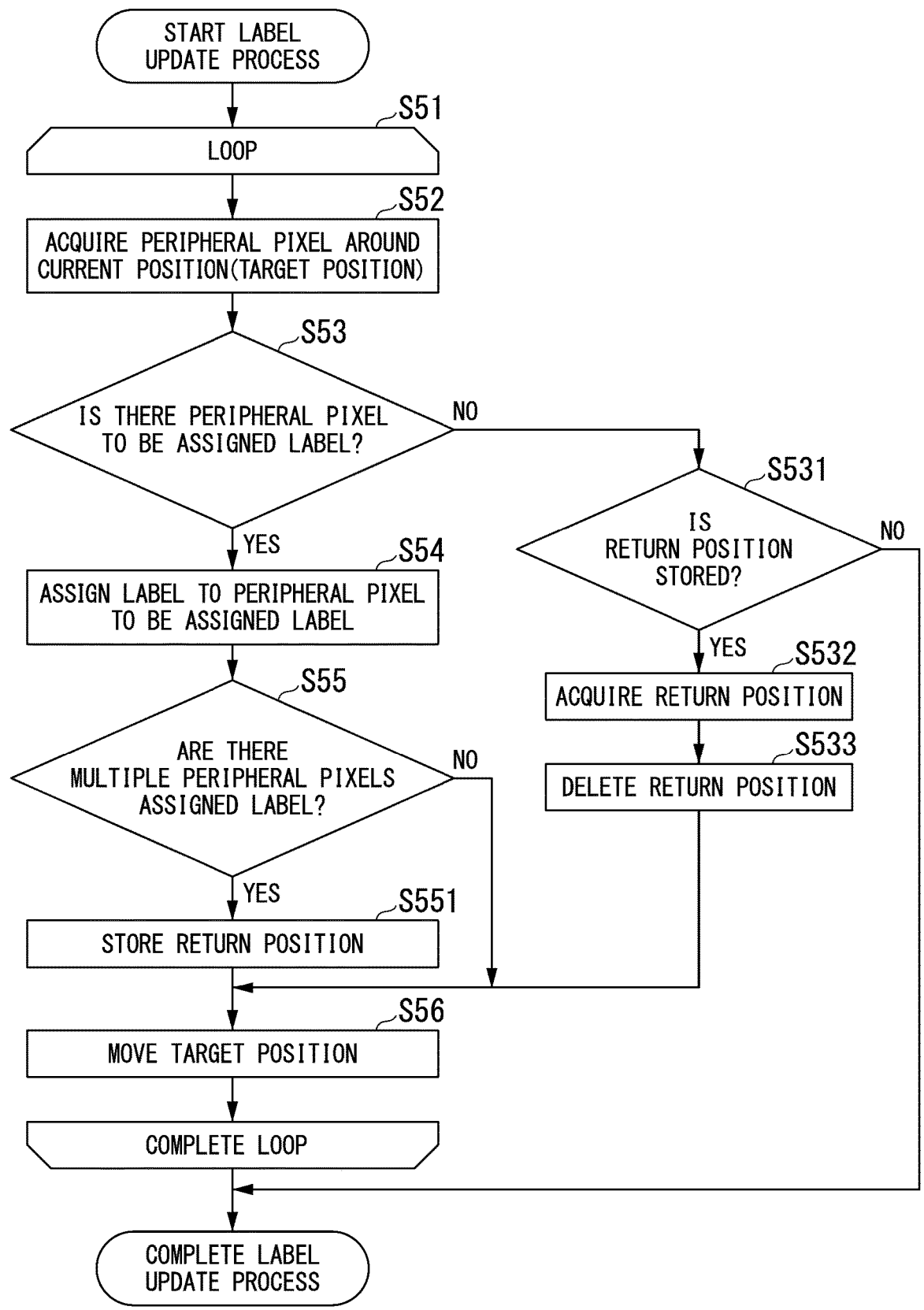
FIG. 3 is a flowchart illustrating a processing procedure of a label update process in a labeling process of an image processing method of an embodiment of the present invention.

FIG. 3 is a flowchart illustrating a processing procedure of the label update process in the labeling process of the image processing method of the embodiment of the present invention. The following description will be provided for a case where peripheral pixels located around the white pixel at the current position as a reference are pixels located at the upper, lower, left, and right sides of the white pixel.

When the label update process is started, the labeling processing unit 20 firstly sets the current position of the white pixel as a reference as a target position in the loop of step S51. Then, the labeling processing unit 20 acquires (reads) the pixel values of respective pixels located at the upper, lower, left, and right sides of the white pixel at the target position included in the binary image data from the binary image memory 10 (step S52).

Subsequently, based on the acquired pixel values of the respective pixels, the labeling processing unit 20 determines whether a target pixel to be assigned a label is present at any one of the upper, lower, left, and right sides of the target position (step S53). The process of the labeling processing unit 20 in step S53 is the same as that of step S30 in the flowchart illustrated in FIG. 2. More specifically, in step S53, when the pixel value of a pixel arranged at least one of the upper, lower, left, and right sides is a pixel value representing a white pixel, the labeling processing unit 20 determines that there is the target pixel to be assigned the label, and when the pixel values of all the pixels at the upper, lower, left, and right sides is a pixel value representing a black pixel, the labeling processing unit 20 determines that there is no target pixel to be assigned the label.

When it is determined in step S53 that there is the target pixel to be assigned the label ("YES" of step S53), the labeling processing unit 20 assigns a label, which has the same value as that of the label assigned to the white pixel at the current position (the target position) as a reference, to each pixel determined to be the target pixel to be assigned the label (step S54). That is, in step S54, the labeling processing unit 20 assigns the label, which has the value assigned in step S40 of the flowchart illustrated in FIG. 2, to each pixel determined to be the target pixel to be assigned the label. In this way, the labeling processing unit 20 assigns the label with the same value to all peripheral pixels located (arranged adjacent to) around (at the upper, lower, left, and right sides of) the current position (the target position) and determined to be the target pixel to be assigned the label.

Subsequently, the labeling processing unit 20 determines whether there are a plurality of peripheral pixels assigned the label with the same value in step S54 (step S55). In other words, in step S55, the labeling processing unit 20 determines whether a plurality of pixels located at the upper, lower, left, and right sides at the target position have the pixel value representing the white pixel.

When it is determined in step S55 that there are no peripheral pixels assigned the label with the same value, that is, there is one peripheral pixel having the pixel value representing the white pixel ("NO" of step S55), the labeling processing unit 20 moves the target position to the position of this pixel (step S56). Then, the labeling processing unit 20 repeats the process of the loop of step S51 at the moved target position.

On the other hand, when it is determined in step S55 that there are a plurality of peripheral pixels assigned the label with the same value, that is, there are two or more peripheral pixels having the pixel value representing the white pixel ("YES" of step S55), the labeling processing unit 20 temporarily stores information on a position other than one pixel to be set as the next target position in the return position memory 30 as a return position (step S551). That is, in step S551, the labeling processing unit 20 temporarily stores information on a position of another pixel not to be set as the next target position in the return position memory 30 as a return position. Then, similarly to the case where it is determined that there are no peripheral pixels assigned the label with the same value ("NO" of step S55), the labeling processing unit 20 moves the target position to a position of one pixel (that is, the position of the one pixel to be set as the next target position) not stored in the return position memory 30, and repeats the process of the loop of step S51 at the moved target position in step S56.

On the other hand, when it is determined in step S53 that there is no target pixel to be assigned the label ("NO" of step S53), the labeling processing unit 20 determines whether any return position has been stored in the return position memory 30 (step S531). That is, in step S531, the labeling processing unit 20 determines whether a position of a peripheral pixel to be moved as the next target position has been stored in the return position memory 30.

When it is determined in step S531 that return positions have been stored in the return position memory 30 ("YES" of step S531), the labeling processing unit 20 acquires any return position stored in the return position memory 30 (step S532).

Subsequently, the labeling processing unit 20 deletes (erases) the acquired return position from the return position memory 30 (step S533). Then, in step S56, the labeling processing unit 20 moves the target position to the position of the pixel represented by the return position acquired from the return position memory 30 and repeats the process of the loop of step S51 at the moved target position.

On the other hand, when it is determined in step S531 that no return positions have been stored in the return position memory 30 ("NO" of step S531), the labeling processing unit 20 determines that the label update process of assigning a label has been completed for the peripheral pixels located around the white pixel at the current position as a reference and having the same pixel value, and completes the label update process without performing the loop of step S51.

In this way, in the labeling process, the labeling processing unit 20 repeats the determination regarding whether the target pixel to be assigned the label is present among pixels at the new current position after the transverse position in the next transverse position loop of step S20 in the flowchart illustrated in FIG. 2 is moved.

As described above, the labeling processing unit 20 moves the current position of the pixels in the raster order from the pixels arranged at the upper left of the binary image data stored in the binary image memory 10, and assigns a label with the same value to the peripheral pixels, which are arranged adjacent to the periphery of the pixel at the current position and have the same pixel value, by the loop of step S51 based on a pixel determined to be the target pixel to be assigned a label. In this way, the labeling processing unit 20 expands areas of pixels assigned the label with the same value from the current position as a reference. In such a case, in step S551, the labeling processing unit 20 temporarily stores information on a position other than a pixel to be moved as the next target position in the return position memory 30 as a return position. That is, when there are a plurality of directions in which the areas of the pixels assigned the label with the same value are expanded, the labeling processing unit 20 temporarily stores, in the return position memory 30, only information on the positions of pixels arranged adjacent to one another in a direction different from the directions in which the areas are expanded. Therefore, the storage capacity of the return position memory 30 can be set to a storage capacity smaller than that required for temporarily storing and processing information on the positions of pixels in all directions in which areas are expanded as with the labeling process using the related area expansion method. That is, in the image processing device 1 that performs the image processing method of the present invention, when the labeling process is performed, a storage capacity required for temporarily storing the position of the target pixel to be assigned a label can be made smaller than that in the related labeling process. By so doing, in the image processing device 1 that performs the image processing method of the present invention, access of the labeling processing unit 20 to the return position memory 30 is reduced, so that the labeling process can be performed at a speed higher than that in the related image processing device. Furthermore, the circuit scale of the image processing device 1 that performs the image processing method of the present invention can be made smaller than that of the related image processing device.

Figure 4A:
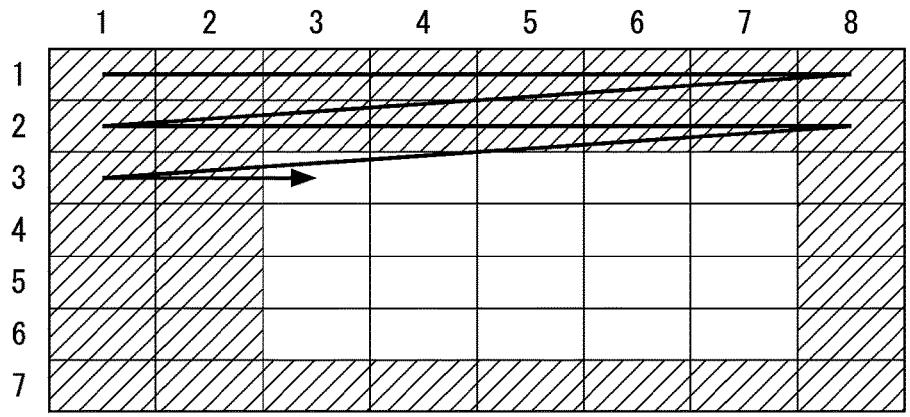
FIG. 4A is a diagram schematically illustrating an example of an image to be subjected to a labeling process in an image processing method in an embodiment of the present invention.
Figure 4B:
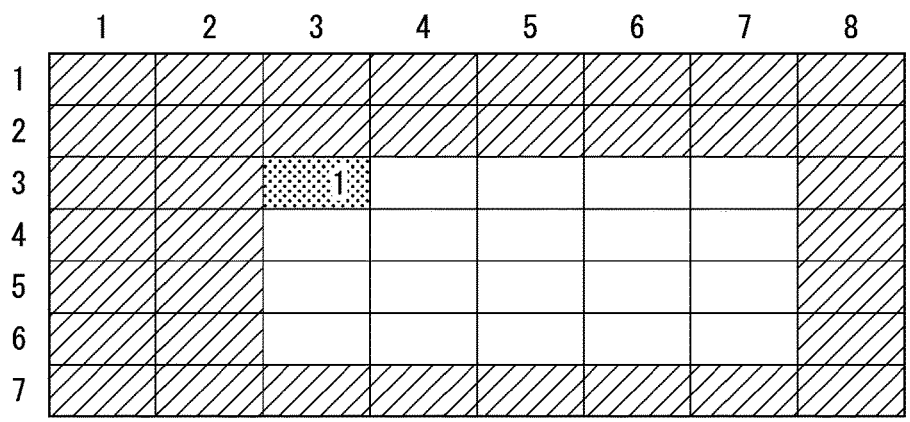
FIG. 4B is a diagram schematically illustrating an example of an image to be subjected to a labeling process in an image processing method in an embodiment of the present invention.

Next, an example of the labeling process by the labeling processing unit 20 provided in the image processing device 1 will be described. FIG. 4A to FIG. 4O are diagrams schematically illustrating an example of an image to be subjected to the labeling process in the image processing method in the embodiment of the present invention. FIG. 4A to FIG. 4O illustrate step by step states in which an area where a label with the same value is assigned to pixels included in the binary image and having the same pixel value is expanded by the labeling process and the label update process by the labeling processing unit 20.

FIG. 4A to FIG. 4O illustrate an example of the binary image data stored in the binary image memory 10. In the binary image data illustrated in FIG. 4A to FIG. 4O, pixels are arranged in a two-dimensional matrix of 7 rows×8 columns. Furthermore, in the binary image data illustrated in FIG. 4A to FIG. 4O, the pixels in the third row and third column to the sixth row and seventh column are white pixels and the other pixels are black pixels. The following description will be provided for a case where a label with the same value is assigned to the white pixels. An example of the binary image data illustrated in FIG. 4B to FIG. 4N corresponds to the labeling image data generated by the labeling processing unit 20 and stored in the labeling image memory 40.

In the following description, in order to easily identify the position of each pixel in the binary image data (the labeling image data) illustrated in FIG. 4A to FIG. 4O, a row number and a column number corresponding to the position of each pixel are indicated in "parentheses ( )". In the "parentheses ( )", the first number is a row number representing the position in a longitudinal direction (a vertical direction, a column direction) of a pixel and the last number is a column number representing the position in a transverse direction (a horizontal direction, a row direction) of the pixel. For example, a pixel in the second row and third column is represented as a pixel (2, 3) and a pixel in the fifth row and seventh column is represented as a pixel (5, 7).

In the labeling process, as described above, by the longitudinal position loop of step S10 and the transverse position loop of step S20, the labeling processing unit 20 sequentially acquires (reads pixel values) respective pixels, which are included in the binary image data stored in the binary image memory 10, in the raster order from pixels arranged at the upper left, and determines whether the acquired pixels are the target pixel to be assigned a label. More specifically, as in an example illustrated in FIG. 4A, the labeling processing unit 20 sequentially reads the pixel values of the respective pixels while moving the current position from a pixel (1, 1) located at the upper left of the binary image data to a pixel (1, 2), a pixel (1, 3), and so on. Then, as in the example illustrated in FIG. 4A, after the pixel value of the pixel (1, 8) is read, the labeling processing unit 20 sets the current position as the pixel (2, 1) and then sequentially reads the pixel values of the respective pixels while moving the current position from the pixel (2, 1) to the pixel (2, 2), and so on, in the same manner.

In the example illustrated in FIG. 4A, when the position of the pixel (3, 3) is set as the current position, if the pixel value of the pixel (3, 3) is determined to be a white pixel to be assigned a label in step S30, the labeling processing unit 20 assigns the label to the pixel (3, 3) in step S40. Here, the value of the label to be assigned is assumed to "1". An example illustrated in FIG. 4B indicates a state in which the label with the value of "1" has been assigned to the pixel (3, 3) initially determined by the labeling processing unit 20 to be the white pixel to be assigned the label. Then, the labeling processing unit 20 starts the label update process in step S50 based on the current position of the pixel (3, 3).

In the label update process of the labeling processing unit 20, the current position of the pixel (3, 3) is set as a target position in the $1^{st}$ loop of step S51. In step S52, the labeling processing unit 20 acquires (reads) the pixel values of respective peripheral pixels located around the pixel (3, 3). More specifically, the labeling processing unit 20 reads the pixel values of the pixel (2, 3) located at an upper side of the pixel (3, 3), the pixel (4, 3) located at a lower side of the pixel (3, 3), the pixel (3, 2) located at a left side of the pixel (3, 3), and the pixel (3, 4) located at a right side of the pixel (3, 3). In addition, since the pixel (2, 3) located at the upper side of the pixel (3, 3) and the pixel (3, 2) located at the left side of the pixel (3, 3) have been already determined not to be the white pixel (that is, determined to be a black pixel) by the longitudinal position loop of step S10 and the transverse position loop of step S20, that is, by the raster scan, the labeling processing unit 20 may not read the pixel values of these pixels.

Figure 4C:
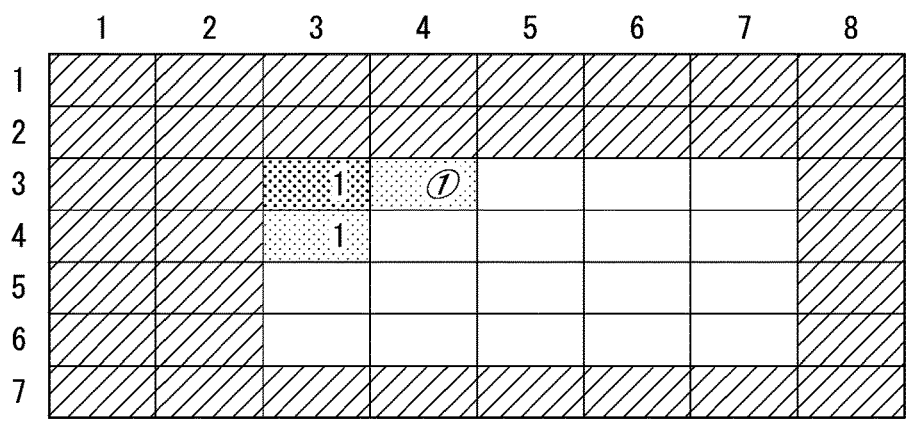
FIG. 4C is a diagram schematically illustrating an example of an image to be subjected to a labeling process in an image processing method in an embodiment of the present invention.

In step S53, based on the read pixel values of the pixel (4, 3) and the pixel (3, 4), the labeling processing unit 20 determines whether these pixels are target pixels to be assigned a label, and in step S54, the labeling processing unit 20 assigns the label with the same value as that assigned to the pixel (3, 3) to the target pixels to be assigned the label. An example illustrated in FIG. 4C illustrates a state in which the labeling processing unit 20 determines that the pixel (4, 3) and the pixel (3, 4) are the target pixels to be assigned the label and has assigned the label with the same value of "1" as that assigned to the pixel (3, 3).

In step S55, the labeling processing unit 20 determines whether there are a plurality of peripheral pixels assigned the label with the same value. In the example illustrated in FIG. 4C, since the label with the same value is assigned to the pixel (4, 3) and the pixel (3, 4) in step S54, the labeling processing unit 20 determines that there are a plurality of peripheral pixels assigned the label with the same value. In this way, in step S551, the labeling processing unit 20 temporarily stores information on a position other than a pixel to be set as the next target position in the return position memory 30 as a return position. The example illustrated in FIG. 4C illustrates a state in which the labeling processing unit 20 sets the pixel (4, 3) as a pixel to be the next target position and temporarily stores information on the position of the pixel (3, 4) in the return position memory 30 as a return position. In the example illustrated in FIG. 4C, in order to easily identify the pixel of which position information has been stored in the return position memory 30 as the return position, the value of the label assigned to the pixel is surrounded by a circle.

In the labeling process using the related area expansion method, information on the positions of the pixel (4, 3) and the pixel (3, 4) is stored in the return position memory 30 as return positions. In contrast, in the labeling process of the image processing method of the embodiment of the present invention, since the information on the position of only the pixel (3, 4) is stored in the return position memory 30 as the return position, the storage capacity of the return position memory 30 is smaller than that in the related art. In the state of the example illustrated in FIG. 4C, the storage capacity of the return position memory 30 corresponds to a half of that in the related art.

Figure 4D:
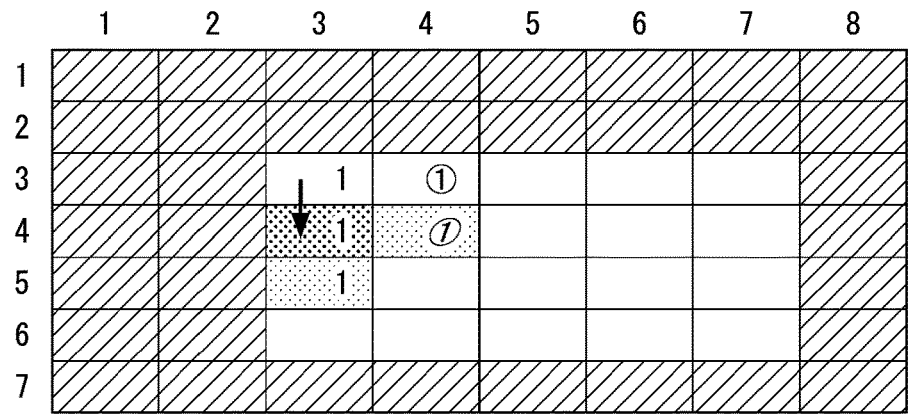
FIG. 4D is a diagram schematically illustrating an example of an image to be subjected to a labeling process in an image processing method in an embodiment of the present invention.

In step S56, the labeling processing unit 20 moves to the position of the pixel (4, 3) as the next target position and performs the process of the $2^{nd}$ loop of step S51. An example illustrated in FIG. 4D illustrates a state in which the labeling processing unit 20 has moved the target position to the position of the pixel (4, 3).

In the $2^{nd}$ loop of step S51, the labeling processing unit 20 acquires (reads) pixel values of respective peripheral pixels located around the pixel (4, 3) at the moved target position in step S52. More specifically, the labeling processing unit 20 reads the pixel values of the pixel (3, 3) located at an upper side of the pixel (4, 3), the pixel (5, 3) located at a lower side of the pixel (4, 3), the pixel (4, 2) located at a left side of the pixel (4, 3), and the pixel (4, 4) located at a right side of the pixel (4, 3). In addition, since the pixel (4, 2) located at the left side of the pixel (4, 3) has already been determined not to be the white pixel (that is, determined to be the black pixel) by the raster scan, the labeling processing unit 20 may not read the pixel value of the pixel (4, 2). Furthermore, since the pixel (3, 3) located at the upper side of the pixel (4, 3) is a pixel at the original target position from which the target position has moved this time and has already been assigned the label with the value of "1" in step S40, the labeling processing unit 20 may not read the pixel value of the pixel (3, 3).

Then, similarly to the $1^{st}$ loop of step S51, the labeling processing unit 20 assigns the label with the same value as that assigned to the pixel (3, 3) to a pixel determined to be the target pixel to be assigned the label, and temporarily stores information on a position other than a pixel to be set as the next target position in the return position memory 30 as a return position. The example illustrated in FIG. 4D illustrates a state in which in the $2^{nd}$ loop of step S51, the labeling processing unit 20 assigns the label with the same value of "1" as that assigned to the pixel (3, 3) to the pixel (5, 3) and the pixel (4, 4), sets the pixel (5, 3) as a pixel to be the next target position, and temporarily stores information on the position of the pixel (4, 4) in the return position memory 30 as the return position.

Figure 4E:
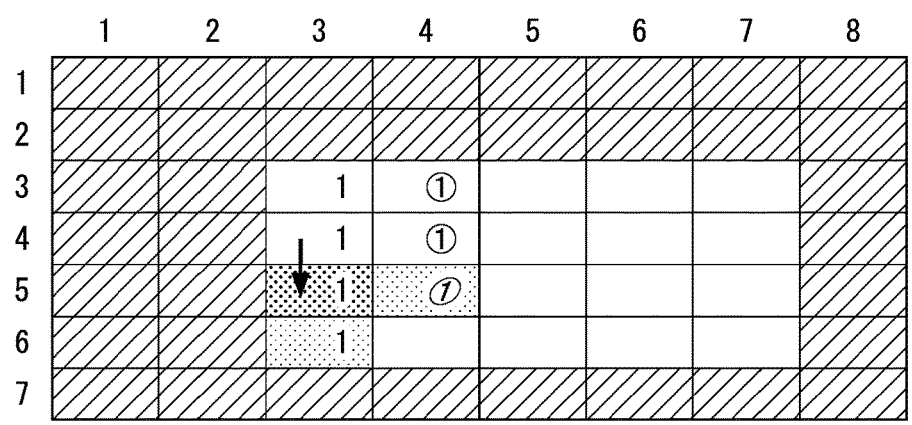
FIG. 4E is a diagram schematically illustrating an example of an image to be subjected to a labeling process in an image processing method in an embodiment of the present invention.

In step S56 of the $2^{nd}$ loop of step S51, the labeling processing unit 20 moves to the position of the pixel (5, 3) as the next target position and performs the process of the $3^{rd}$ loop of step S51. An example illustrated in FIG. 4E illustrates a state in which the labeling processing unit 20 has moved the target position to the position of the pixel (5, 3). Furthermore, the example illustrated in FIG. 4E illustrates a state in which in the $3^{rd}$ loop of step S51, the labeling processing unit 20 assigns the label with the same value of "1" as that assigned to the pixel (3, 3) to the pixel (6, 3) and the pixel (5, 4), sets the pixel (6, 3) as a pixel to be the next target position, and temporarily stores information on the position of the pixel (5, 4) in the return position memory 30 as a return position.

Figure 4F:
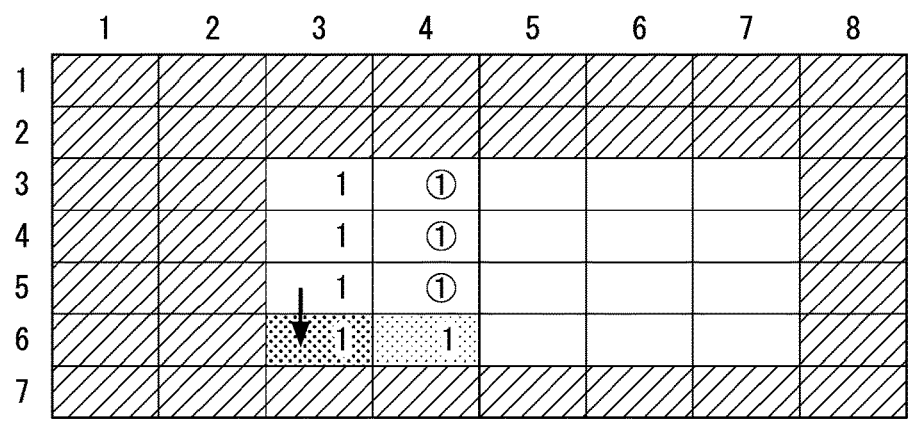
FIG. 4F is a diagram schematically illustrating an example of an image to be subjected to a labeling process in an image processing method in an embodiment of the present invention.

In step S56 of the $3^{rd}$ loop of step S51, the labeling processing unit 20 moves to the position of the pixel (6, 3) as the next target position and performs the process of the $4^{th}$ loop of step S51. An example illustrated in FIG. 4F illustrates a state in which the labeling processing unit 20 has moved the target position to the position of the pixel (6, 3).

In the $4^{th}$ loop of step S51, the labeling processing unit 20 acquires (reads) pixel values of respective peripheral pixels located around the pixel (6, 3) at the moved target position in step S52. More specifically, the labeling processing unit 20 reads the pixel values of the pixel (5, 3) located at an upper side of the pixel (6, 3), the pixel (7, 3) located at a lower side of the pixel (6, 3), the pixel (6, 2) located at a left side of the pixel (6, 3), and the pixel (6, 4) located at a right side of the pixel (6, 3). In addition, since the pixel (6, 2) located at the left side of the pixel (6, 3) has already been determined not to be the white pixel (that is, determined to be the black pixel) by the raster scan, the labeling processing unit 20 may not read the pixel value of the pixel (6, 2). Furthermore, since the pixel (5, 3) located at the upper side of the pixel (6, 3) is a pixel at the original target position from which the target position has moved this time and has already been assigned the label with the value of "1" in step S54 of the $2^{nd}$ loop of step S51, the labeling processing unit 20 may not read the pixel value of the pixel (5, 3).

Then, similarly to other loops of step S51, the labeling processing unit 20 assigns the label with the same value as that assigned to the pixel (3, 3) to a pixel determined to be the target pixel to be assigned the label, and temporarily stores information on a position other than a pixel to be set as the next target position in the return position memory 30 as a return position. In the example illustrated in FIG. 4F, in the $4^{th}$ loop of step S51, the labeling processing unit 20 assigns the label with the same value of "1" as that assigned to the pixel (3, 3) only to the pixel (6, 4). Therefore, in step S55 of the $4^{th}$ loop of step S51, the labeling processing unit 20 determines that there are no peripheral pixels assigned the label with the same value. Accordingly, the labeling processing unit 20 does not store a return position in the return position memory 30 as in the example illustrated in FIG. 4F.

Then, in step S56 of the $4^{th}$ loop of step S51, the labeling processing unit 20 moves to the position of the pixel (6, 4) as the next target position and performs processing after the $5^{th}$ loop of step S51.

Figures 4G, 4H, 4I:
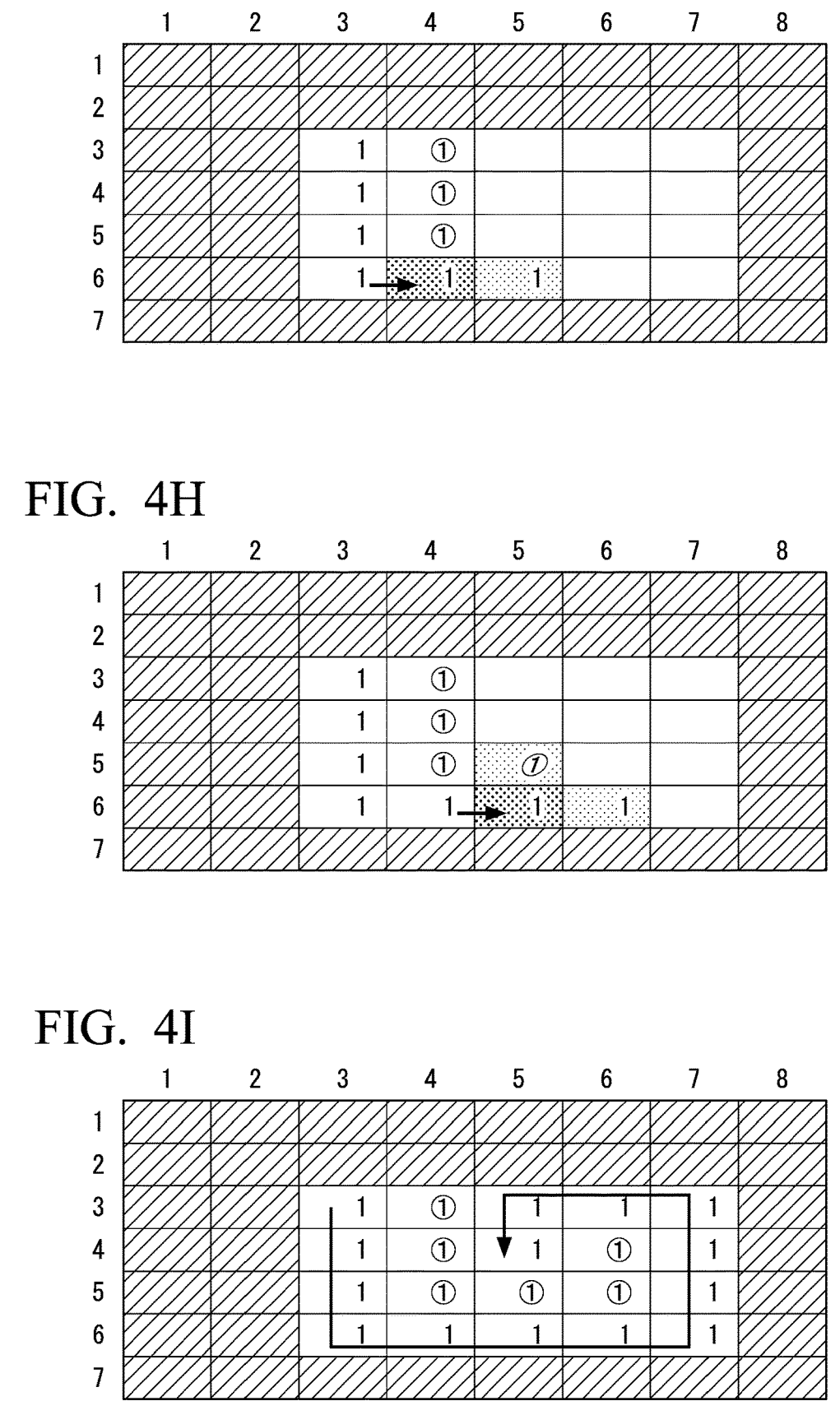
Figures 4M, 4N, 4O:
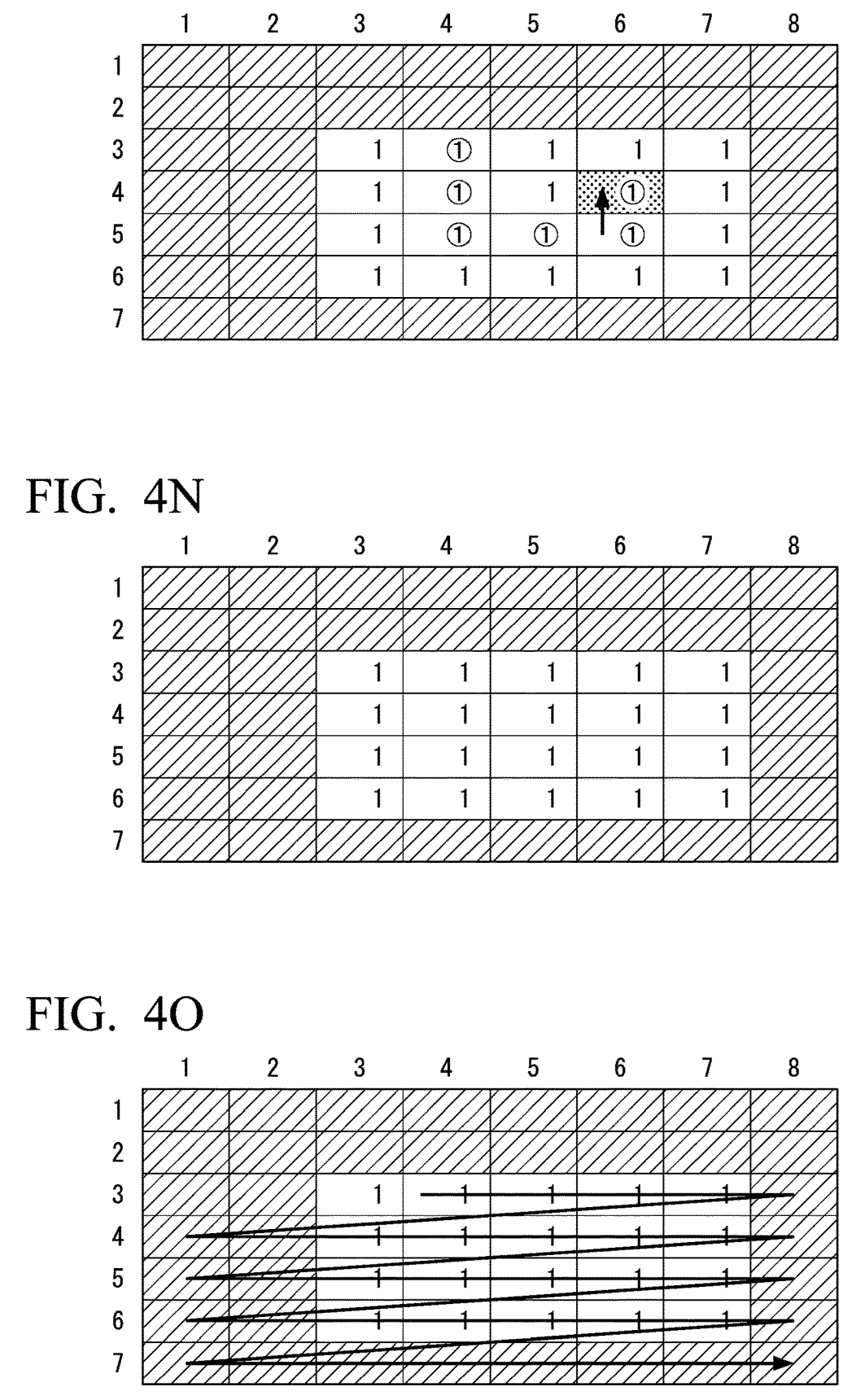

An example illustrated in FIG. 4G illustrates a state in which, in the $4^{th}$ loop of step S51, the labeling processing unit 20 moves the target position to the position of the pixel (6, 4), and in the $5^{th}$ loop of step S51, the labeling processing unit 20 assigns the label with the same value of "1" as that assigned to the pixel (3, 3) to the pixel (6, 5), sets the pixel (6, 5) as a pixel to be the next target position, and does not store any return position in the return position memory 30. As in the example illustrated in FIG. 4G the labeling processing unit 20 has already assigned the label with the value of "1" to the pixel (5, 4), which is located at the upper side of the pixel (6, 4) as the target position in the $5^{th}$ loop of step S51, in step S54 of the $3^{rd}$ loop of step S51. Therefore, the labeling processing unit 20 may not perform a process of assigning the label to the pixel (5, 4) in step S54 of the $5^{th}$ loop of step S51. Then, the labeling processing unit 20 sets the position of any peripheral pixel, which is located around the target position subjected to the process of assigning the label, as the next target position. Therefore, in the $5^{th}$ loop of step S51, the labeling processing unit 20 moves the target position to the position of the pixel (6, 5) as in an example illustrated in FIG. 4H.

Furthermore, the example illustrated in FIG. 4H illustrates a state in which, in the $6^{th}$ loop of step S51, the labeling processing unit 20 assigns the label with the value of "1" to the pixel (6, 6) and the pixel (5, 5), sets the pixel (6, 6) as a pixel to be the next target position, and temporarily stores information on the position of the pixel (5, 5) in the return position memory 30 as a return position.

Similarly, the labeling processing unit 20 repeats processes of assigning the label with the same value of "1" as that assigned to the pixel (3, 3) to peripheral pixels located (arranged adjacent to) around (at the upper, lower, left, and right sides of) a pixel at the target position in each loop of step S51, storing a return position, which is information on a position other than a peripheral pixel to be set as the next target position, in the return position memory 30, and moving to the position of any peripheral pixel (a peripheral pixel located around the periphery pixel in which the label has been assigned) as the next target position. An example illustrated in FIG. 4I illustrates an example of the order in which the labeling processing unit 20 moves the target position, the label with the value of "1" assigned to the peripheral pixels located (arranged adjacent to) around (at the upper, lower, left, and right sides of) the respective target positions moved in the order, and the positions of the pixels stored in the return position memory 30 as return positions at the respective target positions.

In the labeling process of the image processing method of the embodiment of the present invention, as in the example illustrated in FIG. 4I, information on the positions of pixels not already stored in the return position memory 30, other than pixels to be the next target position at the position of each pixel as the target position, is stored in the return position memory 30 as return positions. In the state of the example illustrated in FIG. 4I, in an area based on the pixel (3, 3), positions other than pixels located on the outer periphery are stored in the return position memory 30 as the return positions. Therefore, the storage capacity of the return position memory 30 becomes much smaller than a storage capacity required for storing information on the positions of pixels in all directions in which an area is expanded in the labeling process using the related area expansion method. For example, when areas of all pixels included in an image are areas of target pixels to be assigned a label with the same value, the labeling process using the related area expansion method requires a storage capacity capable of storing the positions of pixels having the same number as that of the pixels of the image. In contrast, in the labeling process of the image processing method of the embodiment of the present invention, a storage capacity capable of storing only the positions of pixels, other than pixels located on the outer periphery of the binary image, as return positions is the storage capacity of the return position memory 30.

Then, as in an example illustrated in FIG. 4J, in the 13$^{th}$ loop of step S51, the target position is moved to the position of the pixel (4, 5), the labeling processing unit 20 acquires (reads) pixel values of respective peripheral pixels located around the pixel (4, 5) at the moved target position. More specifically, the labeling processing unit 20 reads the pixel values of the pixel (3, 5) located at an upper side of the pixel (4, 5), the pixel (5, 5) located at a lower side of the pixel (4, 5), the pixel (4, 4) located at a left side of the pixel (4, 5), and the pixel (4, 6) located at a right side of the pixel (4, 5). In addition, as in the example illustrated in FIG. 4J, the respective peripheral pixels located around the pixel (4, 5) have already been assigned the label with the value of "1". That is, in the example illustrated in FIG. 4J, since the pixel (3, 5) is a pixel at the original target position from which the target position has moved this time, the pixel (3, 5) has already been assigned the label with the value of "1", and the pixel (5, 5), the pixel (4, 4), and the pixel (4, 6) have already been assigned the label with the value of "1" in step S54 of the previous loop of the step S51. Therefore, the labeling processing unit 20 determines that there is no target pixel to be assigned a label in step S53 of the 14$^{th}$ loop of step S51. Accordingly, the labeling processing unit 20 acquires the return positions stored in the return position memory 30 in step S531 to step S533 of the 14$^{th}$ loop of step S51. For example, the labeling processing unit 20 acquires the return position initially stored in the return position memory 30 and corresponding to the pixel (3, 4). Then, in step S56 of the 14$^{th}$ loop of step S51, the labeling processing unit 20 moves the acquired return position to the position of the pixel (3, 4) as a new target position and performs processing after the 15$^{th}$ loop of step S51.

An example illustrated in FIG. 4K illustrates a state in which the labeling processing unit 20 has moved the new target position to the position of the pixel (3, 4) in step S56 of the 14$^{th}$ loop of step S51. An example illustrated in FIG. 4L illustrates an example of the order in which the labeling processing unit 20 performs the processing after the 15$^{th}$ loop of step S51.

At each target position moved in the order as in an example illustrated in FIG. 4L, the label with the value of "1" has already been assigned to respective peripheral pixels located around the target position. Therefore, the labeling processing unit 20 completes the label update process in a process of only sequentially moving the target position to the return positions stored in the position memory 30 in each loop after the 15$^{th}$ loop of step S51. Then, in step S531 to step S533 of the 19$^{th}$ loop of step S51, the labeling processing unit 20 acquires the return position finally stored in the position memory 30 and corresponding to the pixel (4, 6), moves the target position to the position of the pixel (4, 6) as the acquired return position in step S56, and performs the process of the 20$^{th}$ loop of step S51.

An example illustrated in FIG. 4M illustrates a state in which the labeling processing unit 20 has moved the target position to the position of the pixel (4, 6). As in the example illustrated in FIG. 4M, in the 19$^{th}$ loop of step S51, even when the target position has moved to the position of the pixel (4, 6), the label with the value of "1" has already been assigned to respective peripheral pixels located around the target position. Therefore, in step S531 of the 20$^{th}$ loop of step S51, the labeling processing unit 20 determines that no return position is stored in the return position memory 30. In this way, the labeling processing unit 20 determines that the label update process has been completed, and completes the label update process of step S50 based on the white pixel of the pixel (3, 3) at the current position of the example illustrated in FIG. 4A without performing the process of the loop of step S51. By so doing, the labeling processing unit 20 expands an area arranged adjacent to the white pixel of the pixel (3, 3), and performs the labeling process of assigning the label with the same value of "1" as that assigned to the pixel (3, 3) to all the pixels in the area as in an example illustrated in FIG. 4N.

Thereafter, as in an example illustrated in FIG. 4O, the labeling processing unit 20 sequentially acquires (reads) the pixel values of respective pixels while moving the current position in the raster order from the pixel (3, 4), and performs the label update process in the same manner when it is determined that the pixels are white pixels to be assigned a label in step S30. Then, when the labeling processing unit 20 sequentially sets all the pixels included in the binary image data stored in the binary image memory 10 as the current position in the raster order and completes determination regarding whether all the pixels are the pixels to be assigned the label in step S30, the labeling processing unit 20 determines that the labeling process has been completed and completes the labeling process.

Hereinafter, an example of the labeling image generated by the labeling process of the labeling processing unit 20 provided in the image processing device 1 will be described. FIG. 5 is a diagram schematically illustrating an example of an image subjected to the labeling process in the image processing method of the embodiment of the present invention. FIG. 5 (a) illustrates an example of the binary image data stored in the binary image memory 10. Furthermore, FIG. 5 (b) illustrates an example of the labeling image data generated by the labeling process of the labeling processing unit 20. In the binary image data illustrated in FIG. 5 (a), pixels are arranged in a two-dimensional matrix of 7 rows×8 columns, the pixels in the second row and second column to the fourth row and fourth column and pixels in the fourth row and sixth column to the fifth row and seventh column are white pixels and the other pixels are black pixels.

When the labeling processing unit 20 performs the labeling process on the binary image data as in the example of FIG. 5 (a), the labeling image data, in which labels with different values have been assigned to each area where the white pixels included in the binary image data have been gathered, is generated. More specifically, as in the example of FIG. 5 (b), the labeling image data is generated, in which an area where the white pixels are arranged adjacent to one another based on the pixel (2, 2) included in the binary image data is expanded and the label with the same value of "1" is assigned to the pixel (2, 2) to the pixel (4, 4) and an area where the white pixels are arranged adjacent to one another based on the pixel (4, 6) is expanded and the label with the same value of "2" is assigned to the pixel (4, 6) to the pixel (5, 7). Also in such a case, the labeling processing unit 20 performs the labeling process on the areas of the respective white pixels while appropriately using the return position memory 30.

As described above, the labeling processing unit 20 stores information on the positions of pixels not already stored in the return position memory 30, other than pixels to be the next target position at the position of each pixel as the target position, in the return position memory 30 as return positions. Then, in the labeling process of the labeling processing unit 20, a label with the same value is assigned to each area of respective white pixels. In such a case, since the labeling processing unit 20 sequentially deletes (erases) the return positions stored in the return position memory 30 in step S533 of each loop of step S51, all the return positions stored in the return position memory 30 are deleted (erased) at the time point at which the labeling process for one white pixel area has been completed. Therefore, the labeling processing unit 20 can perform the labeling process with the storage capacity of the return position memory 30 smaller than that in the labeling process using the related area expansion method. For example, when an area of all pixels included in an image is an area of pixels to be assigned a label with the same value, a storage capacity capable of storing only the positions of pixels, other than pixels located on the outer periphery of the binary image, as return positions is the storage capacity of the return position memory 30 as described above.

Furthermore, as illustrated in FIG. 5 (*a*), when there are a plurality of areas to be assigned a label, only the positions of pixels, other than pixels located on the outer periphery of each area, are stored as the return positions, so that the storage capacity of the return position memory 30 to be used in the labeling process can be further reduced. In this way, the number of accesses to the return position memory 30 when the labeling processing unit 20 performs the labeling process is reduced, so that it is possible to speed up the labeling process.

According to the embodiment, an image processing method (a labeling process), in which pixels included in an input image (for example, a binary image) are scanned in a predetermined scanning order (for example, a raster order, the processing procedure illustrated in FIG. 2: the longitudinal position loop of step S10 and the transverse position loop of step S20) and a label with the same predetermined value is assigned to each pixel area where the pixels with the same pixel value included in the image (for example, the binary image) are arranged adjacent to one another and are gathered, is configured, and includes a pixel determination step (step S30 and step S40) of sequentially determining whether the pixels are pixels to be assigned the label based on pixel values of the pixels obtained by the scanning (for example, a raster scan: the longitudinal position loop of step S10 and the transverse position loop of step S20) and assigning a predetermined new label to the pixels determined to be assigned the label, and a label update step (step S50: the loop of step S51) of setting a position of the pixel assigned the label as a target position and assigning the label with the same value to peripheral pixels located around the pixel at the target position, wherein the label update step (step S50: the loop of step S51) repeats (performs step S531 to step S533) a peripheral pixel determination step (step S52 and step S53) of determining whether the peripheral pixels are peripheral pixels to be assigned the label based on pixel values of the peripheral pixels, a label assignment step (step S54) of assigning the label to the peripheral pixels determined to be assigned the label in the peripheral pixel determination step (step S52 and step S53), a target position movement step (step S56) of moving a new target position to a position of any one of the peripheral pixels assigned the label in the label assignment step (step S54), and a return position storage step (step S55 and step S551) of, when there are a plurality of peripheral pixels assigned the label in the label assignment step (step S54), storing positions of the peripheral pixels, other than the peripheral pixel at the new target position moved in the target position movement step (step S56), as a return position, until there is no return position stored in the return position storage step (step S55 and step S551).

Furthermore, according to the embodiment, in the image processing method (the labeling process), the label update step (step S50: the loop of step S51) is started after assigning (step S40) the new label to any pixel in the pixel determination step (step S30 and step S40), and in the label update step (step S50: the loop of step S51), the label with the same value as that of the new label assigned to the pixel in the pixel determination step (step S30 and step S40) is assigned to each peripheral pixel in the label assignment step (step S54), and after the label update step (step S50: the loop of step S51) is completed, the scanning (for example, a raster scan: the longitudinal position loop of step S10 and the transverse position loop of step S20) is resumed.

Furthermore, according to the embodiment, the pixel determination step (step S30 and step S40) constitutes the image processing method (the labeling process) in which all the pixels included in the image (for example, the binary image) are scanned in the raster order.

Furthermore, according to the embodiment, the target position movement step (step S56) constitutes the image processing method (the labeling process) in which the new target position is moved to the position of any one peripheral pixel located at the lower side or the right side of the target position.

Furthermore, according to the embodiment, the image processing method (the labeling process) in which the image is the binary image is configured.

Furthermore, according to the embodiment, an image processing device (the image processing device 1), which scans pixels included in an input image (for example, a binary image) in a predetermined scanning order (for example, a raster order, the processing procedure illustrated in FIG. 2: the longitudinal position loop of step S10 and the transverse position loop of step S20) and assigns a label with the same predetermined value to each pixel area where the pixels with the same pixel value included in the image (for example, the binary image) are arranged adjacent to one another and are gathered, is configured, and includes a processing unit (the labeling processing unit 20) that performs the image processing method (the labeling process) including a pixel determination step (step S30 and step S40) of sequentially determining whether the pixels are pixels to be assigned the label based on pixel values of the pixels obtained by the scanning (for example, a raster scan: the longitudinal position loop of step S10 and the transverse position loop of step S20) and assigning a predetermined new label to the pixels determined to be assigned the label, and a label update step (step S50: the loop of step S51) of setting a position of the pixel assigned the label as a target position and assigning the label with the same value to peripheral pixels located around the pixel at the target position, wherein the label update step (step S50: the loop of step S51) repeats (performs step S531 to step S533) a peripheral pixel determination step (step S52 and step S53) of determining whether the peripheral pixels are peripheral pixels to be assigned the label based on pixel values of the peripheral pixels, a label assignment step (step S54) of assigning the label to the peripheral pixels determined to be assigned the label in the peripheral pixel determination step (step S52 and step S53), a target position movement step (step S56) of moving a new target position to a position of any one of the peripheral pixels assigned the label in the label assignment step (step S54), and a return position storage step (step S55 and step S551) of, when there are a plurality of peripheral pixels assigned the label in the label assignment step (step S54), storing positions of the peripheral pixels, other than the peripheral pixel at the new target position moved in the target position movement step (step S56), as return positions, until there is no return position stored in the return position storage step (step S55 and step S551).

Furthermore, according to the embodiment, the image processing device 1 is constituted by the labeling processing unit 20 that starts the label update step (step S50: the loop of step S51) of the image processing method (the labeling process) after assigning the new label to any pixel in the pixel determination step (step S30 and step S40), and in the label update step (step S50: the loop of step S51), the label with the same value as that of the new label assigned to the pixel in the peripheral pixel determination step (step S52 and step S53) is assigned to each peripheral pixel in the label assignment step (step S54), and the scanning (for example, a raster scan: the longitudinal position loop of step S10 and the transverse position loop of step S20) is resumed after the label update step (step S50: the loop of step S51) is completed.

Furthermore, according to the embodiment, the image processing device 1, which includes a return position storage unit (the return position memory 30) that stores the return position in the return position storage step (step S55 and step S551), is configured.

As described above, according to the embodiment of the present invention, in the labeling process, the labeling processing unit sequentially acquires (reads) the pixel values of respective pixels included in the binary image in a raster order, and determines whether a pixel at the current position is the target pixel to be assigned the label based on the acquired pixel values of the pixels. Furthermore, in the embodiment of the present invention, the labeling processing unit assigns the label to the pixel at the current position when it is determined that the pixel at the current position is the target pixel to be assigned the label, sets the pixel at the current position assigned the label as a reference, and performs the label update process on peripheral pixels located around the pixel. Furthermore, according to the embodiment of the present invention, in the label update process, the labeling processing unit sets the current position as a reference as a target position, acquires (reads) the pixel values of respective peripheral pixels located around the pixel at the target position, and assigns the label with the same value as that assigned to the pixel at the target position to respective peripheral pixels determined to be the target pixel to be assigned the label and located around the pixel at the target position. Furthermore, in the embodiment of the present invention, the labeling processing unit temporarily stores information on the positions of pixels other than a pixel to be set as the next target position, that is, information on the positions of pixels not located at the next target position as return positions. In other words, in the embodiment of the present invention, in the labeling process, only information on the positions of peripheral pixels arranged adjacent to one another in a direction different from the movement direction of the target position is temporarily stored as the return position. In this way, in the embodiment of the present invention, it is possible to reduce the storage capacity of the return position memory that stores the return position.

Furthermore, in the embodiment of the present invention, the labeling processing unit sequentially moves the target position, and repeats the assignment of a label to respective pixels located around a peripheral pixel determined to be the target pixel to be assigned the label and the storage of information (a return position) on the positions of peripheral pixels not located at the next target position in the same manner. Thereafter, in the embodiment of the present invention, after a series of processes moved from the initial target position are completed, the labeling processing unit acquires (reads) any stored return position as a new target position and repeats a series of processes moved from the new target position in the same manner. In this way, in the embodiment of the present invention, it is possible to generate labeling image data in which the label with the same value has been assigned to a pixel area where pixels (for example, white pixels) with the same color as pixels included in the binary image and are to be assigned the label are arranged adjacent to one another and are gathered.

In addition, in the embodiment of the present invention, labels with different values are assigned to a pixel area where pixels (for example, white pixels) with the same color are arranged adjacent to one another at different positions and are gathered. In this way, in the embodiment of the present invention, it is possible to generate labeling image data in which labels with different values are assigned to each pixel area where the pixels (for example, white pixels) with the same color included in the binary image are arranged adjacent to one another and are gathered.

In this way, in the embodiment of the present invention, in the labeling process in the labeling processing unit of expanding an area where the pixels (for example, white pixels) with the same color and to be assigned the label with the same value are arranged adjacent to one another and are gathered, the storage capacity of the return position memory that stores the return position is reduced, so that it is possible to reduce the circuit scale of the image processing device mounted with the labeling processing unit that performs the labeling process. Furthermore, in the embodiment of the present invention, when the labeling processing unit that performs the labeling process, it is possible to reduce the number of accesses to the return position memory stored with the return position, so that it is possible to shorten the processing time of the labeling process, that is, to speed up the labeling process.

In addition, the embodiment of the present invention has described an example of the labeling process in which four pixels located at the upper, lower, left, and right sides of the target position are used as peripheral pixels located (arranged adjacent to) around the pixel at the target position. However, the peripheral pixels located (arranged adjacent to) around the pixel at the target position are not limited to the pixels located at the upper, lower, left, and right sides of the target position. For example, it may be possible to perform a labeling process in which eight pixels located at the upper, lower, left, and right sides of the target position including an oblique direction are used as the peripheral pixels located (arranged adjacent to) around the pixel at the target position. In such a case, since the labeling process can be considered the same as the aforementioned labeling process, except for acquiring (reading) the pixel values of respective pixels located at the upper, lower, left, and right sides of the target position including the oblique direction in the process of step S52 in the flowchart illustrated in FIG. 3, a detailed description thereof will be omitted.

Furthermore, the embodiment of the present invention has not described how to set the value of the label assigned to pixel areas, where the pixels (for example, white pixels) with the same color are arranged adjacent to one another and are gathered, to a value different for each area. However, since the method for setting the value of the label to the value different for each area can use various existing technologies, a detailed description thereof will be omitted.

Furthermore, the embodiment of the present invention has described an example in which, in the labeling process, the pixel values of respective pixels included in the binary image are sequentially acquired (read) in the raster order by the longitudinal position loop of step S10 and the transverse position loop of step S20, that is, a raster scan is performed, so that the target pixel to be assigned a label is detected. However, the order of acquiring (reading) the pixel values of the respective pixels included in the binary image, that is, a method for scanning the binary image is not limited to the raster scan described in the embodiment. For example, it may be possible to use a scanning method for repeating the order of acquiring (reading) the pixel values of pixels arranged at the upper right by performing scanning in the transverse direction (the horizontal direction, the row direction) rightward from pixels arranged at the upper left of the binary image, and then scanning pixels of the next row leftward in the transverse direction (the horizontal direction, the row direction). More specifically, in the example of the binary image data illustrated in FIG. 5 (a), it may be possible to use a scanning method in which scanning is sequentially performed in the order of a pixel (1, 1), . . . , a pixel (1, 8), a pixel (2, 8), . . . , a pixel (2, 1), a pixel (3, 1), . . . , a pixel (3, 8), and so on. Furthermore, for example, it may be possible to use a method for sequentially acquiring (reading) pixel values from pixels arranged at the upper left of the binary image to pixels arranged at the lower right while moving up and down in an oblique direction, a so-called a zigzag scanning method. More specifically, in the example of the binary image data illustrated in FIG. 5 (a), it may be possible to use a scanning method in which scanning is performed in a zigzag manner in the order of a pixel (1, 1), a pixel (2, 1), a pixel (1, 2), a pixel (1, 3), a pixel (2, 2), a pixel (3, 1), a pixel (4, 1), a pixel (3, 2), a pixel (2, 3), a pixel (1, 4), and so on. Furthermore, even when the pixel values of the respective pixels included in the binary image are acquired (read) by any scanning method, the concept of the present invention can be applied in the same manner and the same effects as the present invention can be obtained.

Furthermore, the embodiment of the present invention has described a case of generating labeling image data by assigning a label to a binary image obtained by binarizing the pixel values of respective pixels included in an image captured by an image sensor into white pixels and black pixels by a predetermined threshold value and the like. However, an image to be assigned the label is not limited to the binary image illustrated in the embodiment, and the concept of the present invention can be applied in the same manner to a labeling process on an image converted into many more values, and the same effects as the present invention can be obtained.

While preferred embodiments of the present invention have been described, it should be understood that the present invention are not limited to these embodiments and modification examples thereof. Additions, omissions, substitutions, and other modifications of configurations can be made without departing from the spirit or scope of the present invention.

Furthermore, the present invention is not limited by the foregoing description, and is only limited by the scope of the appended claims.

According to the aforementioned embodiment, it is possible to provide an image display method and an image display apparatus, by which it is possible to perform a labeling process of reducing a storage capacity for temporarily storing the positions of target pixels to be assigned a label and expanding areas of target pixels to be assigned a label with the same value.

What is claimed is:

1. An image processing method, in which pixels included in an input image are scanned in a predetermined scanning order and a label with a predetermined value is assigned to each pixel area where the pixels with a same pixel value included in the image are arranged adjacent to one another and are gathered, the image processing method comprising:
   a pixel determination step of sequentially determining whether the pixels are pixels to be assigned the label based on pixel values of the pixels obtained by the scanning and assigning a predetermined new label to the pixels determined to be assigned the label; and
   a label update step of setting a position of the pixel assigned the label as a target position and assigning the label with the same value to peripheral pixels located around the pixel at the target position,
   wherein the label update step repeats
      a peripheral pixel determination step of determining whether the peripheral pixels are peripheral pixels to be assigned the label based on pixel values of the peripheral pixels,
      a label assignment step of assigning the label to the peripheral pixels determined to be assigned the label in the peripheral pixel determination step,
      a target position movement step of moving a new target position that is a position of any one of the peripheral pixels assigned the label in the label assignment step, and
      a return position storage step of, when there are a plurality of peripheral pixels assigned the label in the label assignment step, storing positions of the peripheral pixels, other than the peripheral pixel at the new target position moved in the target position movement step, as a return position,
   until there is no return position stored in the return position storage step,
   in the return position storage step, when there are a plurality of directions in which areas of the pixels assigned the label with the same value are expanded, only information on positions of pixels arranged adjacent to one another in a direction different from the direction in which the areas are expanded is temporarily stored in a return position memory.

2. The image processing method according to claim 1, wherein,
   in the image processing method, the label update step is started after assigning the new label to any pixel in the pixel determination step, and
   in the label update step, the label with the same value as the value of the new label assigned to the pixel in the pixel determination step is assigned to each peripheral pixel in the label assignment step, and after the label update step is completed, the scanning is resumed.

3. The image processing method according to claim 2, wherein, in the pixel determination step, all the pixels included in the image are scanned in a raster order.

4. The image processing method according to claim 3, wherein, in the target position movement step, the new target position is moved to a position of any one peripheral pixel located at a lower side or a right side of the target position.

5. The image processing method according to claim 4, wherein the image is a binary image.

6. An image processing device, which scans pixels included in an input image in a predetermined scanning order and assigns a label with a predetermined value to each pixel area where the pixels with the same pixel value included in the image are arranged adjacent to one another and are gathered, the image processing device comprising:

a processor configured to perform an image processing method including
- a pixel determination step of sequentially determining whether the pixels are pixels to be assigned the label based on pixel values of the pixels obtained by the scanning and assigning a predetermined new label to the pixels determined to be assigned the label; and
- a label update step of setting a position of the pixel assigned the label as a target position and assigning the label with the same value to peripheral pixels located around the pixel at the target position, wherein the label update step repeats
- a peripheral pixel determination step of determining whether the peripheral pixels are peripheral pixels to be assigned the label based on pixel values of the peripheral pixels,
- a label assignment step of assigning the label to the peripheral pixels determined to be assigned the label in the peripheral pixel determination step,
- a target position movement step of moving a new target position that is a position of any one of the peripheral pixels assigned the label in the label assignment step, and
- a return position storage step of, when there are a plurality of peripheral pixels assigned the label in the label assignment step, storing positions of the peripheral pixels, other than the peripheral pixel at the new target position moved in the target position movement step, as a return position, until there is no return position stored in the return position storage step, in the return position storage step, when there are a plurality of directions in which areas of the pixels assigned the label with the same value are expanded, the processor temporarily stores, in a return position memory, only information on positions of pixels arranged adjacent to one another in a direction different from the direction in which the areas are expanded.

7. The image processing device according to claim 6, wherein
the processor starts the label update step of the image processing method after assigning the new label to any pixel in the pixel determination step, and
in the label update step, the label with the same value as the value of the new label assigned to the pixel in the pixel determination step is assigned to each peripheral pixel in the label assignment step, and the scanning is resumed after the label update step is completed.

8. The image processing device according to claim 7, wherein the image processing device includes a return position storage unit that stores the return position in the return position storage step.

* * * * *